United States Patent
Craft et al.

(10) Patent No.: US 10,201,244 B2
(45) Date of Patent: Feb. 12, 2019

(54) PACKAGING SYSTEM FOR INFANT NUTRITIONAL COMPOSITION WITH DOSING DEVICES

(71) Applicant: NESTEC S.A., Vevey (CH)

(72) Inventors: Brian Craft, Clarens (CH); Frederic Destaillats, Servion (CH); Sagar Thakkar, St-Legier (CH)

(73) Assignee: Nestec S.A., Vevey (CH)

( * ) Notice: Subject to any disclaimer, the term of this patent is extended or adjusted under 35 U.S.C. 154(b) by 175 days.

(21) Appl. No.: 15/104,021

(22) PCT Filed: Sep. 2, 2014

(86) PCT No.: PCT/EP2014/068591
§ 371 (c)(1),
(2) Date: Jun. 13, 2016

(87) PCT Pub. No.: WO2015/086172
PCT Pub. Date: Jun. 18, 2015

(65) Prior Publication Data
US 2016/0316959 A1    Nov. 3, 2016

(30) Foreign Application Priority Data

Dec. 12, 2013   (EP) ..................................... 13196830

(51) Int. Cl.
*B65D 85/00*        (2006.01)
*A47J 31/40*        (2006.01)
(Continued)

(52) U.S. Cl.
CPC ............. *A47J 31/404* (2013.01); *A23L 33/40* (2016.08); *A61J 7/0023* (2013.01); *B65D 85/70* (2013.01);
(Continued)

(58) Field of Classification Search
CPC ...... B65D 77/245; B65D 85/70; A47J 31/404; A61J 7/0023
(Continued)

(56) References Cited

U.S. PATENT DOCUMENTS 2,259,504 A * 10/1941 Wilson .................. G01F 19/002
                                                   30/326
D141,881 S * 7/1945 Mathewson ..................... 30/324
(Continued)

FOREIGN PATENT DOCUMENTS

FR    2915969    11/2008
GB    2468969     9/2010
(Continued)

OTHER PUBLICATIONS

Baird et al. "Being big or growing fast: systematic review of size and growth in infancy and later obesity" BMJ, 2005, vol. 331, No. 7522, 6 pages.
(Continued)

*Primary Examiner* — Luan K Bui
(74) *Attorney, Agent, or Firm* — K&L Gates LLP

(57) ABSTRACT

A packaging system for infant nutritional composition with dosing devices (304, 305), comprises a first dosing device (304) for dispensing a first quantity of said infant nutritional composition, said first quantity being adapted to boys, and a second dosing device (305) for dispensing a second quantity of said infant nutritional composition, said second quantity being adapted to girls, said first quantity being different from said second quantity.

12 Claims, 4 Drawing Sheets

(51) Int. Cl.
*A61J 7/00* (2006.01)
*G01F 19/00* (2006.01)
*A23L 33/00* (2016.01)

(52) U.S. Cl.
CPC ........ *G01F 19/002* (2013.01); *A23V 2002/00* (2013.01)

(58) Field of Classification Search
USPC ..... 206/229, 459.1, 459.5; 220/735; 73/426, 73/429; 426/231
See application file for complete search history.

(56) References Cited

U.S. PATENT DOCUMENTS

| | | | |
|---|---|---|---|
| 4,043,203 A | 8/1977 | Montesi | |
| 5,678,450 A * | 10/1997 | Robbins | G01F 19/00 73/426 |
| 5,706,974 A * | 1/1998 | Murdick | B65D 51/246 206/230 |
| 2007/0102061 A1* | 5/2007 | Tsao | B65D 77/245 141/380 |
| 2008/0041861 A1* | 2/2008 | Crawford | B65D 25/2897 220/697 |
| 2008/0156808 A1* | 7/2008 | Perry | B65D 25/2897 220/560.03 |
| 2010/0031747 A1* | 2/2010 | Hall | G01F 19/002 73/426 |
| 2010/0308065 A1* | 12/2010 | Vandamme | B65D 43/169 220/697 |
| 2011/0239760 A1* | 10/2011 | Su | G01F 19/00 73/427 |
| 2011/0262601 A1* | 10/2011 | Manser | A23L 1/296 426/231 |
| 2012/0167679 A1* | 7/2012 | Delaney | G01F 19/002 73/429 |
| 2015/0298883 A1* | 10/2015 | Van Puijenbroek | B65D 77/245 426/106 |

FOREIGN PATENT DOCUMENTS

| | | |
|---|---|---|
| WO | 2004042331 | 5/2004 |
| WO | 2008138230 | 11/2008 |
| WO | 2010003878 | 1/2010 |
| WO | 2012087619 | 6/2012 |

OTHER PUBLICATIONS

Powe et al. "Infant Sex Predicts Breast Milk Energy Content" American Journal of Human Biology, 2010, vol. 22, pp. 50-54.

* cited by examiner

PACKAGING SYSTEM FOR INFANT NUTRITIONAL COMPOSITION WITH DOSING DEVICES

CROSS REFERENCE TO RELATED APPLICATIONS

The present application is a National Stage of International Application No. PCT/EP2014/068591, filed on Sep. 2, 2014, which claims priority to European Patent Application No. 13196830.7, filed Dec. 12, 2013, the entire contents of which are being incorporated herein by reference.

TECHNICAL FIELD

The invention concerns a packaging system for infant nutritional composition with dosing devices.

More generally, the invention concerns a gender-based dosing system for synthetic nutritional formulations, particularly milk based compositions, for infants and young children. The dosing system allows one to dose powder or spoonable compositions according to the sex of the infant.

BACKGROUND OF THE INVENTION

In general human breast milk represents the uncontested gold standard in terms of infant nutrition. However, in some cases breastfeeding is inadequate or unsuccessful for medical reasons or because of mother choice not to breastfeed. Infant formulae have been developed for these situations.

Infant formulae, follow-up formulae and grown-up milks which may be aimed at different age groups of 0 to 6 months, 6 months to 1 year and 1 year to 3 years respectively, are known. These infant formulae, follow-up formulae and grown-up milks aim to meet the requirements of infants and young children at the different ages. An age-tailored nutrition system for infants is described in WO 2009/068549, wherein a protein nature and content are adapted to specific age groups. The recommended World Health Organization (WHO) and Codex Alimentarius Commission guidelines for infant formulae and follow-up formulae state that the infant formulae and follow-up formulae shall not provide less than 60 kcal/10 mL and not more than 85 kcal/100 mL.

Generally, conventional infant formulae and follow-up formulae tend to provide about 67 kcal/100 mL.

There is generally a tendency to overfeed infants and young children. Usually also, the infant formulae and/or follow-up formulae dosage and caloric density do not take into consideration the complementary food eaten by infants and young children when overfeeding the infants and young children. Furthermore, the dosage and caloric density of infant formulae and/or follow-up formulae do not take into consideration the sex of the child. Powe and associates [Powe C. E. et al. (2010); Infant sex predicts breast milk energy content, American journal of human biology, 22:50-54] have recently reported differences in energy content based on the gender of the new born infant. Milk secreted from the mothers of male infant was reported to be 25% greater in energy content when compared with the milk of mothers of female infants. This recent data is not surprising given that girls and boys have different physiological needs based upon the standard growth curves for boys and girls (see FIGS. 1A and 1B). Thus, the tendency to overfeed infants and young children is even more accentuated for girls, because the dosage instructions and caloric density of current infant formulae and/or follow-up formulae of known infant formulae are the same for boys and girls.

It is known that a rapid growth of infants and young children increases a risk of obesity in later childhood or adulthood (see Baird et al.; Being big or growing fast: systematic review of size and growth in infancy and later obesity. BMJ. 2005; 331(7522):929.). Infant formulas need to reduce the risk of obesity in later childhood or adulthood. In the light of the data from Powe et al. one could postulate the risk of developing obesity is higher for girls.

A number of studies indicate that nutrition in early postnatal life has an impact on long-term appetite regulation. For example, overfeeding rat pups results in altered appetite control with development of hyperphagia in adulthood of the rats (see Davidowa H, Plagemann A; Hypothalamic neurons of postnatally overfed, overweight rats respond differentially to corticotropin-releasing hormones. Neurosci Lett. 2004 Nov. 16; 371(1):64-8).

There is a need to provide a more balanced diet to infants and young children. This diet should take into account the gender as well as the age of the infant or young child. The diet should promote health benefits in the long term to the infants and young children. There is a need to provide a nutritional system that enables the convenient, safe and accurate delivery of the most adequate nutrition all along the first months or years of the life of a baby.

There is a need to provide a way to insure that the best adequate individual nutritional solutions are made available to infants and their care-givers, in order to promote health benefits that may not be immediately visible but which consequences occur later in life.

There is a need to provide such cited nutritional compositions, especially during the first three years of life, that can help ensuring optimal growth and reduction of risk of health conditions later in life, such as cardiovascular diseases, diabetes, obesity, metabolic syndrome, or depressed immunity.

There is, thus, a need to provide a dosing system for infant nutritional compositions that acknowledges the gender of the baby, while insuring optimal growth and reduction of risk of health conditions later in life, such as cardiovascular diseases, diabetes, obesity, metabolic syndrome, or depressed immunity.

There is a need for an early-in-life nutritional intervention or control in order to deliver health benefits later-in-life.

SUMMARY OF THE INVENTION

In a first aspect of the invention there is provided a packaging system for infant nutritional composition with dosing devices, comprising a first dosing device for dispensing a first quantity of said infant nutritional composition, said first quantity being adapted to boys, and a second dosing device for dispensing a second quantity of said infant nutritional composition, said second quantity being adapted to girls, said first quantity being different from said second quantity.

Indeed, the inventors have analyzed the milk from mothers to boys and from mothers to girls, at 30, 60 and 120 days post-partum in a longitudinal clinical study. Based on their results, they have designed a dosing system for synthetic infant and follow-on formulas that doses distinct amounts of infant nutritional composition for boys and girls.

Thanks to the different dosing devices, parents may prepare and deliver an infant formula well adapted to the gender of the infant or the young child, while using the same infant nutritional composition for reconstitution of the infant formula.

In a preferred embodiment of the invention, the first quantity adapted to boys is comprised between 12.5 and 13.9 g of infant nutritional composition in powder to prepare 100 ml of an infant formula and the second quantity adapted to girls is comprised between 11.1 and 12.3 g of infant nutritional composition in powder to prepare 100 ml of an infant formula.

In view of the studies carried out on the composition of the milk from mothers to boys and from mothers to girls, the distinct quantities of total solids for boys and girls are relevant notably for an infant nutritional composition formulated for infants. This distinction evolves with the age of the infant and is more pronounced with children that are older than 2 months, or 3 months.

In a preferred embodiment of the invention, the packaging system is a container comprising infant nutritional composition in powder, the container housing two spoons of different volumes as dosing devices.

Alternatively, the packaging system is a container comprising infant nutritional composition, the container houses one spoon incorporating two graduations adapted respectively to indicate said first quantity and said second quantity.

In one embodiment the first dosing device and the second dosing device are unitary, as for example one single spoon incorporating two graduations adapted respectively to indicate said first quantity and said second quantity.

Advantageously, the two spoons have distinctive visual means for identification, chosen between color of plastic material forming the spoon, or pictograms or letters incorporated in the spoons.

Distinctive visual means are well adapted for the parents to select the right spoon in the container depending on the gender of the infant or young child to be fed.

In another embodiment, the packaging system comprises a first container containing the infant nutritional composition in powder and housing the first dosing device, and a second container containing the infant nutritional composition in powder and housing the second dosing device.

The parents thus select the right container depending on the gender of the infant or young child to be fed.

The packaging of infant nutritional composition is made easier, a same infant nutritional composition being packaged in different containers containing different dosing devices adapted to the nutrition of either boys, or girls.

As a practical embodiment, the first dosing device and the second dosing device are respectively two spoons of different volumes.

In another embodiment, the packaging comprises two sets of capsules as dosing devices, the capsules of a first set containing the first quantity of the infant nutritional composition and the capsules of a second set containing the second quantity of the infant nutritional composition.

The quantity of infant nutritional composition in the capsules is thus differently pre-dosed, depending on whether the capsules are designated as for boys or for girls.

DETAILED DESCRIPTION

Figure 1A:
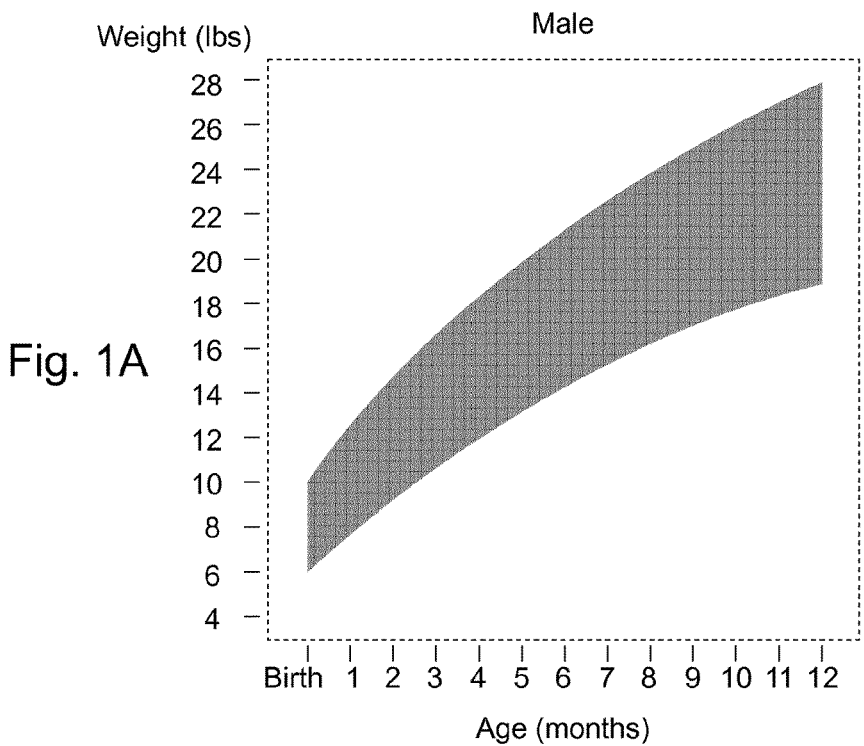
FIG. 1 shows the average growth curves for boys (FIG. 1A) and for girls (FIG. 1B) as published by the World Health Organization [WHO. WHO child growth standards: length/height-for-age, weight-for-age, weight-for-length, weight-for height and body mass index-for-age: methods and development; 2006 (cited 2010 Mar. 3). Available from: http://www.cdc.gov/growthcharts/who_charts.htm].
Figure 1B:
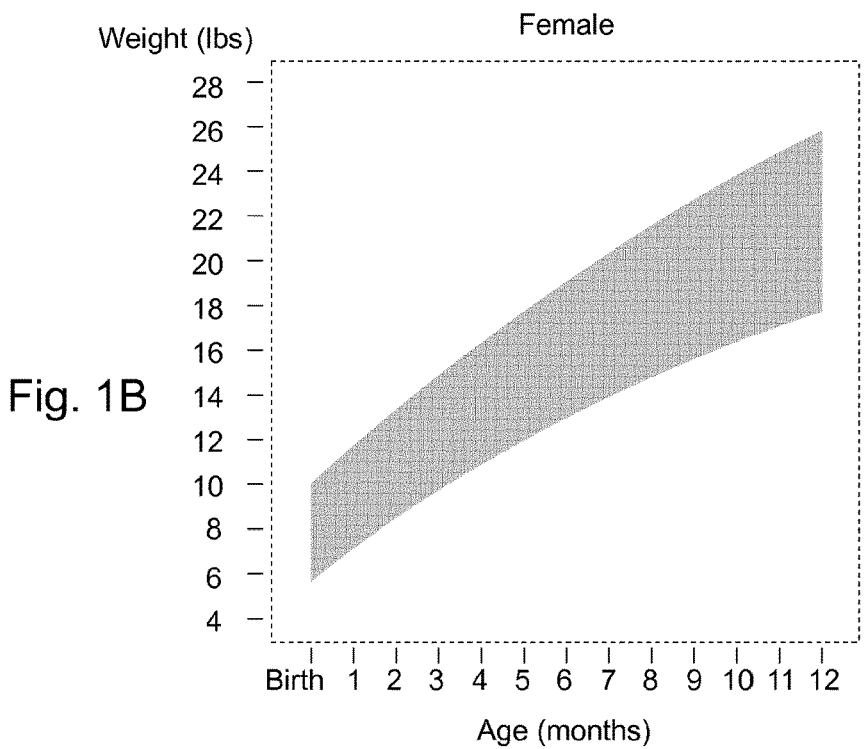

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description. In the present description, the following words are given a definition that should be taken into account when reading and interpreting the description, examples and claims.

Infant: according to the Commission Directive 2006/141/EC of 22 Dec. 2006 on infant formulae and follow-on formulae, article 1.2 (a), the term "infants" means children under the age of 12 months.

Young Children: according to the Commission Directives 2006/141/EC of 22 Dec. 2006 and/or 91/321/EEC of 14 May 1991 on infant formulae and follow-on formulae, article 1.2 (b), the term "young children" means children aged between one and three years.

Infant formulae: according to the Commission Directives 2006/141/EC of 22 Dec. 2006 and/or 91/321/EEC of 14 May 1991 on infant formulae and follow-on formulae, article 1.2 (c), the term "infant formula" means foodstuffs intended for particular nutritional use by infants during the first four to six months of life and satisfying by themselves the nutritional requirements of this category of persons. It has to be understood that infants can be fed solely with infant formulas, or that the infant formula can be used by the carer as a complement of human milk. It is synonymous to the widely used expression "starter formula".

Follow-on formulae: according to the Commission Directives 2006/141/EC of 22 Dec. 2006 and/or 91/321/EEC of 14 May 1991 on infant formulae and follow-on formulae, article 1.2 (d), the term "follow-on formulae" means foodstuffs intended for particular nutritional use by infants aged over four months and constituting the principal liquid element in a progressively diversified diet of this category of persons.

Growing up milk: milk-based nutritional composition suitable especially adapted to a child of greater between one year and three years old.

As used in this specification, the words "comprises", "comprising", and similar words, are not to be interpreted in an exclusive or exhaustive sense. In other words, they are intended to mean "including, but not limited to.

Any reference to prior art documents in this specification is not to be considered an admission that such prior art is widely known or forms part of the common general knowledge in the field.

The invention is further described with reference to the following examples. It will be appreciated that the invention as claimed is not intended to be limited in any way by these examples.

The main principle of the invention is first described.

Longitudinal Clinical Trial:

The present inventors designed a longitudinal clinical trial with 50 lactating mothers with milk sampling at 30 (visit 1), 60 (visit 2) and 120 (visit 3) days post-partum. The milk samples were quantitatively analyzed for energy and total solids.

Human Milk Collection:

The protocol and collection of human milk was reviewed and approved by the local ethical committee of Singapore. The study took place at National University of Singapore. Volunteer mothers of term infants, who were apparently healthy and non-smokers (n=50; 31.1±3.1-year old) provided breast milk samples (approximately 30 mL; 4 weeks post-partum). Samples were collected after full expression from one breast using milk pump and while the baby was fed on the other breast. We made all efforts to collect complete feed that included fore-milk, mid-milk and hind-milk as a representation of one feed and to avoid within feed variation of lipid content. Approximately 30 mL aliquot was separated in a conical polypropylene tube for this study and the rest was fed to the infant. Samples collected for research were stored at −80° C. until analyses.

Total solids Analysis by Mid-Infrared (MIR) Assay: The MIR analyses were performed with the Human Milk Analyzer (HMA, Miris, Sweden). The HMA is based on a semisolid MIR transmission spectroscopy, designed specifically for determination of the macronutrient composition of human milk. The use of the machine was according to manufacturer's instructions. Briefly 1 mL of previously warmed (up to 40° C. in water bath) sample was sonicated for 1 min before manual injection to the milk inlet. The analysis was conducted within next minute before the milk was retrieved and the inlet washed with de-ionized water. The cell was also washed with supplied detergent every 5 sample injections. Also every 10 samples an in-house control as well as calibrating standard provided by Miris was ran for quality control purposes.

Figure 2:
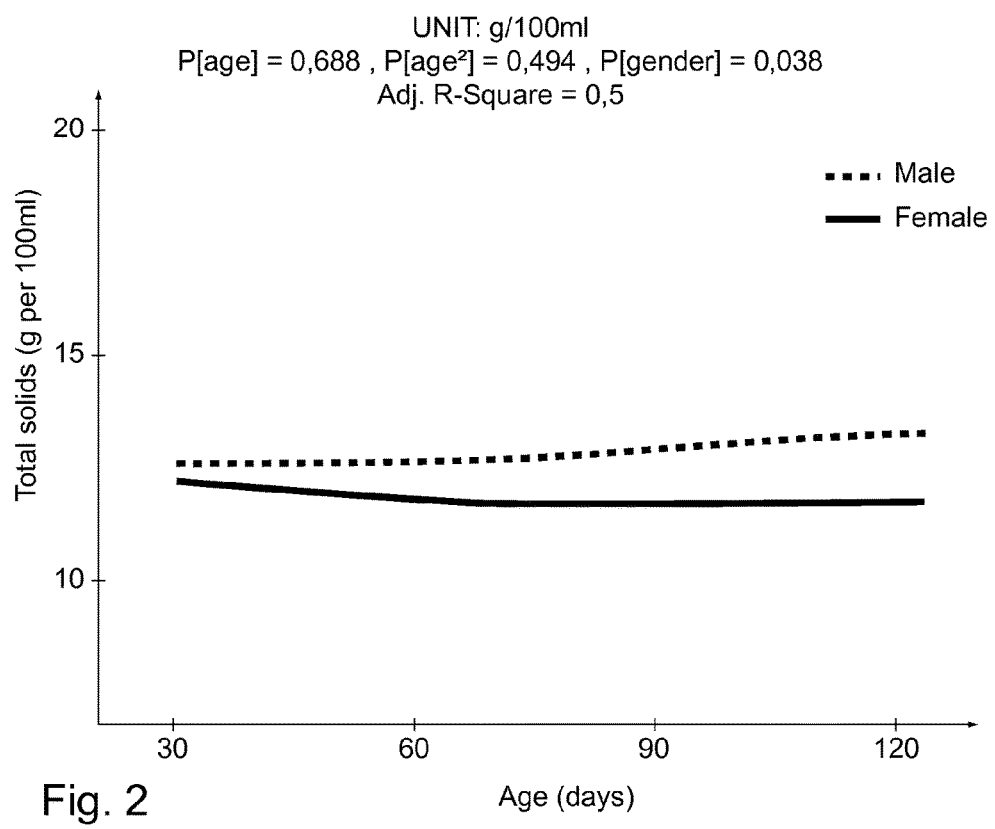
FIG. 2 shows the results of the analysis of total solids in the breast milk of 50 mothers in trial detailed in Example 1. Samples were taken at 30, 60 and 120 days post-partum. Total solids are measured in g/100 ml. The measurements of milk of mothers to boy babies are shown with a dashed line, while the solid line shows the measurements of milk of mothers to girls. The P[gender] value relates to the differences in milk with respect to the sex of the baby. The P[age] values are difference in gender with respect to time; P[age] is a P value considering a linear model and P[age 2] using a quadratic model.

Results are shown in Table 1 and in FIG. 2.

Table 1 below shows the results.

TABLE 1

Longitudinal evolution of total solids in g per 100 mL of human milk secreted for baby boys and baby girls

| Visit | N | Min | Mean | SD | max |
|---|---|---|---|---|---|
| Milk secreted for baby boys | | | | | |
| V1 | 25 | 7.7 | 12.5 | 1.7 | 15.4 |
| V2 | 25 | 8.2 | 12.8 | 2.8 | 21.1 |
| V3 | 25 | 7.5 | 13.2 | 2.8 | 19.6 |
| Milk secreted for baby girls | | | | | |
| V1 | 25 | 8.1 | 12.1 | 1.2 | 13.6 |
| V2 | 25 | 7.6 | 11.9 | 1.8 | 14.5 |
| V3 | 24 | 8.0 | 11.7 | 2.2 | 16.6 |

Statistical Analysis:

Data collection points are 1, 2 and 4 months after infants' birth. Table 1 shows the Min, Mean, SD and Max for each unit of measurement Statistical models fitted to the raw data are shown in FIG. 2. Longitudinal analysis was carried out using linear mixed models. The figures also show the sequential effect of each of the terms age, $age^2$, gender and age-gender interactions in this particular order in terms of the P-value for the corresponding F-test. Thus, the P[age] is a P value considering a linear model and P[$age^2$] corresponds to a quadratic one. If appropriate model is chosen according to the whether the trajectory is linear (P[age]) or curved (P[$age^2$]).

Adjusted R-squares were computed to obtain the degree of variability that is explained by the statistical models used.

Analysis was carried out using the following mixed-effects linear model:

$$Conc:=Age+Age^2+Gender+Age\_Gender+(Age^2)\_Gender+Random\ Effects:$$

Random effects are subject specific terms to model the underlying correlation between repeat measures.

In accordance with the conclusions reached in the clinical trial, the inventors have devised a system of packaging an infant nutritional composition that enables the user to measure a dose of an infant nutritional composition that is appropriate to the age and sex of the infant to be fed, and to do so in a way that is easy, accurate, clean and reproducible.

In particular, a packaging system according to the invention will enable the user to quickly measure out the appropriate dose of infant nutritional composition for an infant aged from birth to 36 months, though it should be noted that the effect of the differential dosage is most pronounced in infants of at least two months, preferably three months in age.

Such a system will therefore provide a first dose of between 12.5 and 13.9 grams of infant nutritional composition in a first dose configured for male infants, and between 11.1 and 12.3 grams in a second dose configured for female infants. The first or second dose is then mixed with water to prepare 100 ml of infant formula.

Figure 3:
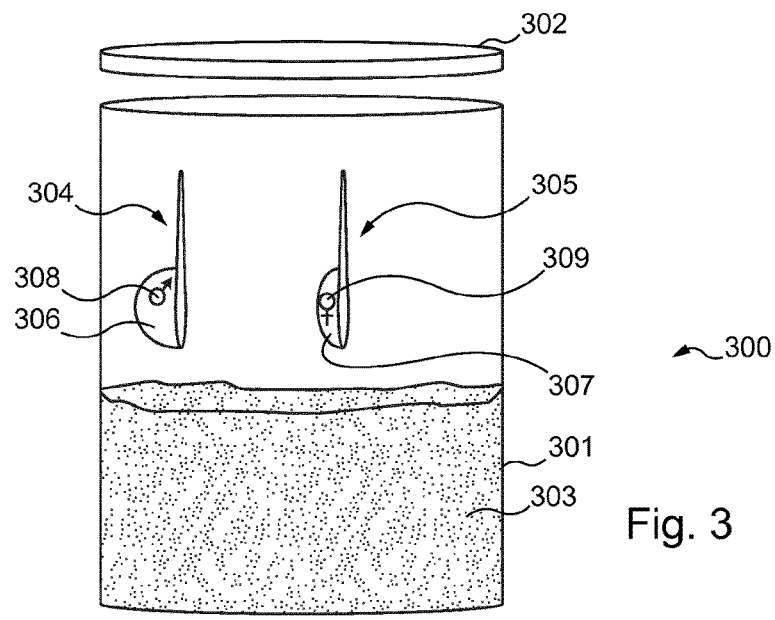
FIG. 3 is a schematic view of a packaging system according to a first embodiment of the invention.

FIG. 3 is a schematic depiction of a container 300 according to a first embodiment of the invention. The container 300 broadly comprises a body 301 and a lid 302, into which a quantity of infant nutritional composition 303 is disposed. The container 300 is here depicted as half-filled with the infant nutritional composition 303 for clarity.

The container 300 is provided with first and second dosing devices in the form of a first spoon 304 and a second spoon 305, comprising a first bowl 306 and a second bowl 307, respectively. The first bowl 306 is configured to have a greater volume than that of the second bowl 307; preferably, the volumes of the first bowl 306 and second bowl 307 are chosen such that the first bowl 306 will contain between 12.5 and 13.9 grams of the infant nutritional composition 303, and the second bowl 307 will contain between 11.1 and 12.3 grams of the infant nutritional composition 303 when employed by a user to scoop out a portion of said infant nutritional composition 303.

It is furthermore to be understood that in FIG. 3 the relative sizes of the first and second bowls 306 and 307 of the first and second spoons 304 and 305 are exaggerated for demonstrative purposes. None of FIG. 3, 4 or 5 should be interpreted as limiting in any respect as to the proportions or relative sizes of any of the components described therein.

The first and second spoons 304 and 305 are each marked as to their intended use: the first spoon 304 is marked with the male pictogram 308, while the second spoon 305 is marked with the female pictogram 309. The provision of the pictograms 308 and 309 upon the first and second spoons 304 and 305 enables the user to quickly and easily identify the sex corresponding to the dose of infant nutritional composition 303 that a particular spoon will measure.

In the first embodiment depicted in FIG. 3, the pictograms 308 and 309 upon the first and second spoons 304 and 305 are the Mars symbol and the Venus symbol, respectively. However, other pictograms may be equally employed, which may be chosen by one skilled in the art according to such factors as ease of fabrication and cultural norms in the market in which the packaging system is to be sold. Such pictograms are preferably molded into the first and second spoons 304 and 305, but may be provided by such alternate means as screen-printing, stamping, or embossing, or may be applied in the form of a label or tag.

Alternately, the first and second spoons 304 and 305 may be fabricated from different materials or in different colors, so as to enable the user to differentiate between the two. For instance, the first spoon 304 may be molded in blue plastic and the second spoon 305 in red or pink plastic.

Of course, other means of differentiating the first and second spoons 304 and 305 are possible, and will depend on the exact characteristics of the particular implementation and the context in which the system is to be sold and utilized.

In another embodiment, the container can house only a single spoon, with two graduations in the bowl of the spoon. A first graduation is adapted to indicate the first quantity of nutritional composition for boys and a second graduation is adapted to indicate the second quantity of nutritional composition for girls.

Figure 4:
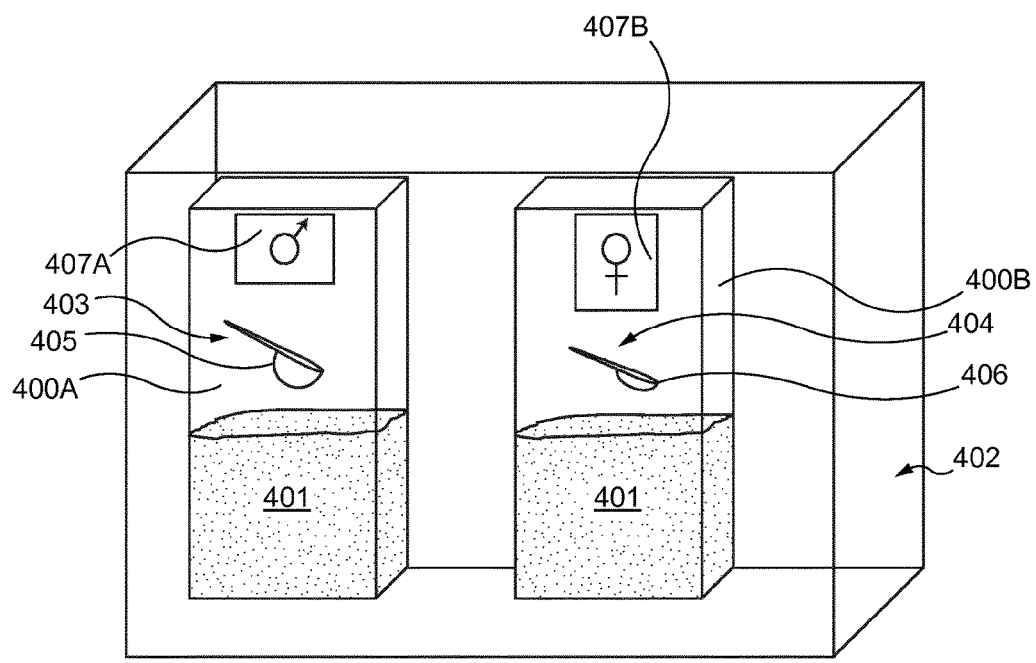
FIG. 4 is a schematic view of a packaging system according to a second embodiment of the invention.

FIG. 4 is a schematic depiction of first and second containers 400A and 400B, according to a second embodiment of the invention. The containers 400A and 400B are similar, each being substantially the same size and containing a quantity of infant nutritional composition 401. As in the first embodiment depicted in FIG. 3, the containers are depicted as partially-filled for illustrative purposes.

The first and second containers 400A and 400B can be disposed within an overpackaging 402 as a packaging system, for instance a cardboard case. While FIG. 4 depicts only one each of said containers 400A and 400B, it should be understood that the overpackaging 402 ideally contains many such containers 400A and 400B, for instance as in a carton or case distributed for wholesale.

In an alternative embodiment, the over-packaging 402 is not necessary.

The first and second containers 400A and 400B can be thus commercialized under the same marketing concept umbrella to form the packaging system of the invention.

The first and second containers 400A and 400B contain a first spoon 403 and a second spoon 404, respectively. As in the first embodiment depicted in FIG. 3, the first spoon 403 is provided with a first bowl 405 with a greater volume than the second bowl 406 of the second spoon 404.

The first and second containers 400A and 400B are further provided with a label 407A and 407B, respectively, which identifies the contents of the container 400A, 400B upon which it is disposed. In the present embodiment the first and second containers 400A and 400B are identified, as above, by the Mars and Venus symbols, though of course other pictograms, text, or indications may be employed as appropriate to the product and market in which it is sold.

The user will thus select the container 400A or 400B appropriate to the sex of the infant to be fed, and be thereby provided with the appropriate first or second spoon 403, 404 for providing the correct dose of the infant nutritional composition 401.

In another embodiment, the infant nutritional composition in the container 400A or 400B can be different, adapted to the gender and/or the age of the child.

As an example, a nutritional composition especially adapted to the nutritional needs of a male infant or child may comprise, any of or a combination of:
  a. 60-85 kcal/100 ml energy, and/or
  b. 3.9-6 g/100 ml lipid, and/or
  c. 600-810 mg/100 ml linoleic acid, and/or
  d. 12.0-13.5 g/100 ml total solids.

A nutritional composition especially adapted to the nutritional needs of a female infant or young child may comprise any of or a combination of:
  a. 56-71 kcal/100 ml energy, and/or
  b. 3.5-4.5 g/100 ml lipid, and/or
  c. 410-580 mg/100 ml linoleic acid, and/or
  d. 11.1-12.2 g/100 ml total solids.

Figure 5:
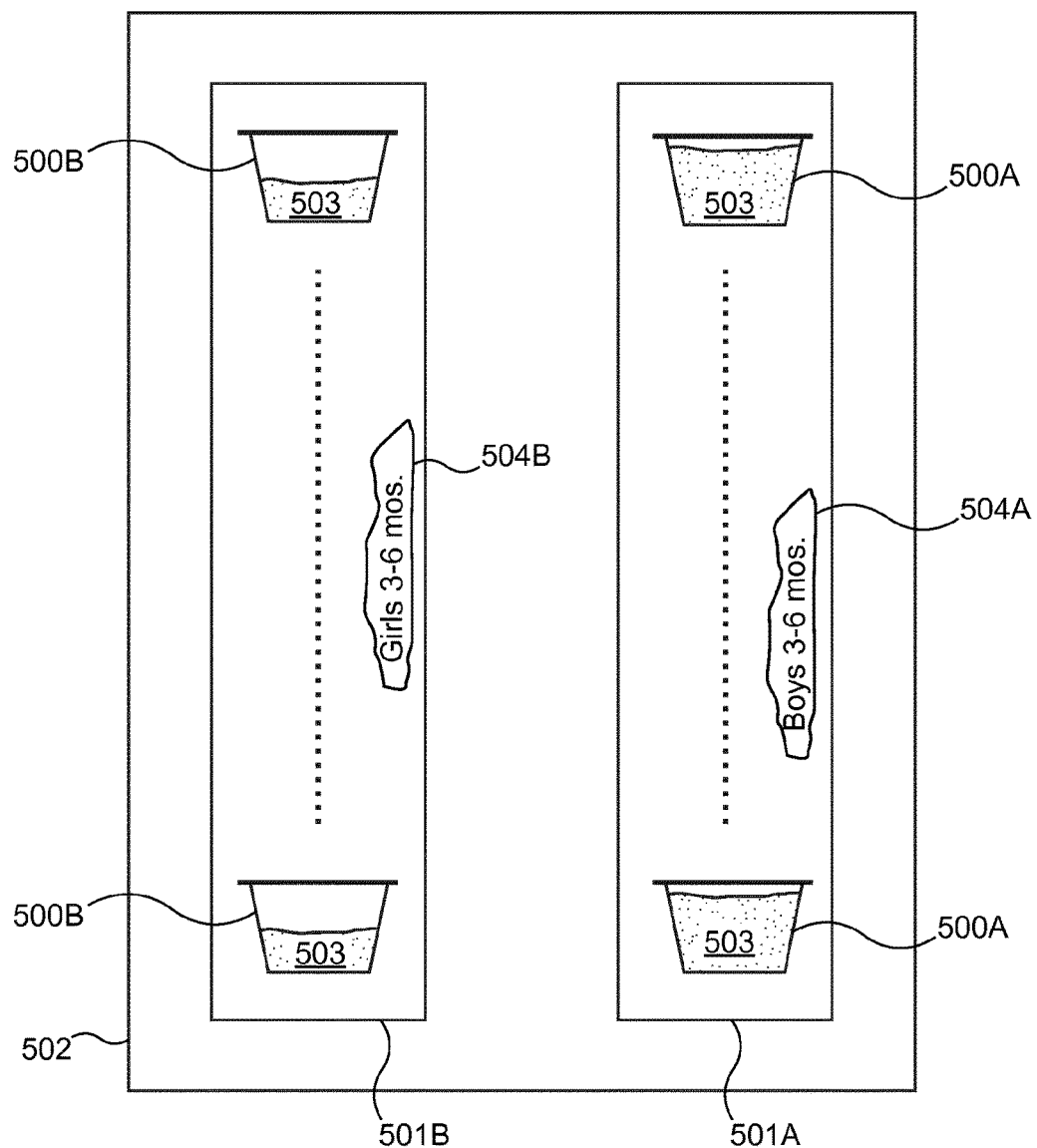
FIG. 5 is a schematic view of a packaging system according to a third embodiment of the invention.

FIG. 5 is a schematic depiction of a packaging system according to a third embodiment of the invention, comprising a set of first capsules 500A and a set of second capsules 500B. Each set comprises a plurality of first or second capsules. Each set of first or second capsules is in this embodiment disposed within a first sleeve 501A and a second sleeve 501B, respectively. For the sake of clarity, only two of the first and second capsules 500A and 500B are respectively depicted within the first and second sleeves 501A and 501B.

Preferably, a plurality of first and/or second sleeves 501A and 501B, each sleeve containing a plurality of first and second capsules 500A and 500B according to its type, are disposed within an overpackaging 502. Said overpackaging 502 may be a bundle or carton of first and/or second sleeves 501A, 501B grouped together for the convenience of the consumer, or may instead be a carton or case such as for wholesale distribution.

It should also be noted that while this embodiment groups the first and second capsules 500A and 500B together in the first and second sleeves 501A and 501B, other packaging means such as bags, boxes, foils, or plastic wrappings may be employed in other embodiments to group together the first and second capsules 500A and 500B.

The set of first capsules 500A and the set of second capsules 500B are commercialized under the same marketing concept umbrella to form the packaging system of the invention.

The first and second capsules 500A and 500B are configured to operate with a food preparation system similar to those commercially available for the preparation of coffee, tea, and other hot beverages. The first and second capsules 500A and 500B are portioned single-served containers for infant formula. The first and second capsules 500A and 500B are, in this embodiment, provided as substantially cup-shaped bodies, each being provided with a quantity of an infant nutritional composition 503.

As in the previous two embodiments, the first capsules 500A are provided with a greater quantity of infant nutritional composition 503 than the second capsules 500B. The user will choose a sleeve containing the type of capsule according to the sex of the infant to be fed: the first capsules 500A for boys, and the second capsules 500B for girls.

Furthermore, in this embodiment the first and second sleeves 501A and 501B are labeled according to the type of capsules 500A, 500B contained therein. In FIG. 5, the first sleeve 501A is provided with a first marking 504A, and the second sleeve 501B is provided with the second marking 504B. The first and second markings 504A and 504B display the sex and age of the infants for which the capsules 500A, 500B within the sleeve 501A, 501B are intended.

The user therefore needs only to purchase a sleeve 501A, 501B which has the markings 504A, 504B corresponding to the sex of the infant in question. By preparing the capsule 500A, 500B according to the normal operating mode of the food preparation system (generally comprising steps to introduce heated water into the capsule 500A/500B, mix said heated water with the infant nutritional composition 503 contained therein, and dispense the resulting formula into a container for consumption), the user is provided with a quantity of infant formula containing the appropriate amount of the infant nutritional composition 503.

Of course, while this particular embodiment uses simple text labels for the first and second markings 504A and 504B, other means of labeling the first and second sleeves 501A and 501B are possible. For instance, color-coding, pictograms, or symbolic labeling may be advantageous depending on the particular composition of the infant nutritional composition 503 and the intended market for the first and second capsules 500A and 500B.

Finally, in another embodiment, the infant nutritional composition in the first and second capsules 500A and 500B can be different, adapted to the gender and/or the age of the child, as described previously.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A packaging system comprising:
   at least one container housing an infant nutritional composition as a powder; and
   dosing devices comprising a first dosing device sized to dispense a first quantity of the infant nutritional composition, the first quantity being adapted for administration to boys, and a second dosing device sized to dispense a second quantity of the infant nutritional composition, the second quantity being adapted for administration to girls, the first quantity is between 12.5 and 13.9 g of the infant nutritional composition, and the second quantity is between 11.1 and 12.3 g of the infant nutritional composition.

2. The packaging system according to claim 1, wherein the infant nutritional composition is formulated for the first quantity of the infant nutritional composition in powder to be reconstituted to 100 ml of a first infant formula and the second quantity of the infant nutritional composition in powder to be reconstituted to 100 ml of a second infant formula.

3. The packaging system according to claim 1, wherein the infant nutritional composition is formulated for administration to infants older than 2 months.

4. The packaging system according to claim 1, wherein the at least one container also houses the first and second dosing devices, which are two spoons of different volumes.

5. The packaging system according to claim 1, wherein the at least one container also houses one spoon incorporating two graduations adapted respectively to indicate the first quantity and the second quantity such that the one spoon comprises the first and second dosing devices.

6. The packaging system according to claim 4, wherein the two spoons have distinctive visual markings for identification, the distinctive visual markings selected from the group consisting of (i) color of plastic material forming the corresponding spoon, (ii) pictograms, and (iii) letters incorporated in the spoons.

7. The packaging system according to claim 1, wherein the at least one container comprises a first container containing a first portion of the infant nutritional composition in powder and housing the first dosing device, and a second container containing a second portion of the infant nutritional composition in powder and housing the second dosing device.

8. The packaging system according to claim 7, wherein the first dosing device and the second dosing device are respectively two spoons of different volumes.

9. The packaging system according to claim 1, wherein the first dosing device comprises a first set of capsules, each of the capsules of the first set containing the first quantity of the infant nutritional composition, the second dosing device comprises a second set of capsules, and each of the capsules of the second set containing the second quantity of the infant nutritional composition.

10. The packaging system according to claim 1, wherein the infant nutritional composition housed by the at least one container is formulated such that the first quantity that is between 12.5 and 13.9 g of the infant nutritional composition results in a first infant formula upon reconstitution to 100 ml of liquid, the first infant formula having at least one characteristic selected from the group consisting of (a) 60-85 kcal/100 ml of the first infant formula, (b) 3.9-6 g lipid/100 ml of the first infant formula, (c) 600-810 mg linoleic acid/100 ml of the first infant formula, and (d) 12.0-13.5 g total solids/100 ml of the first infant formula.

11. The packaging system according to claim 1, wherein the infant nutritional composition is formulated such that the second quantity that is between 11.1 and 12.3888 g of the infant nutritional composition results in a second infant formula upon reconstitution to 100 ml of liquid, the second infant formula having at least one characteristic selected from the group consisting of (a) 56-71 kcal/100 ml of the second infant formula, (b) 3.5-4.5 g lipid/100 ml of the second infant formula, (c) 410-580 mg linoleic acid/100 ml of the second infant formula, and (d) 11.1-12.2 g total solids/100 ml of the second infant formula.

12. The packaging system according to claim 4, wherein the two spoons comprise a first spoon having a first volume that is the first quantity and a second spoon having a second volume that is the second quantity.

* * * * *